US011580326B2

United States Patent
Cheng et al.

(10) Patent No.: US 11,580,326 B2
(45) Date of Patent: Feb. 14, 2023

(54) ONTOLOGY MATCHING BASED ON WEAK SUPERVISION

(71) Applicant: NEC Laboratories Europe GmbH, Heidelberg (DE)

(72) Inventors: Bin Cheng, Sandhausen (DE); Jonathan Fuerst, Heidelberg (DE); Mauricio Fadel Argerich, Heidelberg (DE); Masahiro Hayakawa, Nagoya (JP); Atsushi Kitazawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 285 days.

(21) Appl. No.: 17/013,688

(22) Filed: Sep. 7, 2020

(65) Prior Publication Data

US 2021/0201076 A1 Jul. 1, 2021

Related U.S. Application Data

(60) Provisional application No. 62/954,709, filed on Dec. 30, 2019.

(51) Int. Cl.
 *G06K 9/62* (2022.01)
 *G06N 3/04* (2023.01)

(52) U.S. Cl.
 CPC ........ *G06K 9/6256* (2013.01); *G06K 9/6215* (2013.01); *G06K 9/6264* (2013.01); *G06N 3/0454* (2013.01)

(58) Field of Classification Search
 CPC ...... G06K 9/62; G06K 9/6256; G06K 9/6215; G06K 9/6264; G06N 3/0454; G06N 3/04
 See application file for complete search history.

(56) References Cited

U.S. PATENT DOCUMENTS

| 8,301,633 | B2 | 10/2012 | Cheslow |
| 8,620,931 | B2 | 12/2013 | Zillner |
| 9,740,665 | B2 | 8/2017 | Riskin et al. |
| 10,169,454 | B2 | 1/2019 | Ait-Mokhtar et al. |
| 2007/0217676 | A1* | 9/2007 | Grauman ............ G06K 9/6269 382/190 |

(Continued)

OTHER PUBLICATIONS

Karadeniz, Ilknur et al. "Linking Entities Through an Ontology Using Word Embeddings and Syntactic Re-Ranking," BMC Bioinformatics, 20:156, Mar. 27, 2019.

(Continued)

*Primary Examiner* — Tuan H Nguyen
(74) *Attorney, Agent, or Firm* — Leydig, Voit & Mayer, Ltd.

(57) ABSTRACT

A method is for matching a set of first classes assigned to a first data set with a set of second classes assigned to a second data set. The method includes constructing, via a set of pre-processing functions, a plurality of alignment profiles such that at least one alignment profile is assigned to each of the first classes and each of the second classes. The method includes generating a comparison matrix for each group of the alignment profiles, such that each group includes at least one of the first classes and at least one of the second classes. The method includes training a first machine learning model, through supervised training, based on the generated comparison matrices and based on probabilistic labels generated by a second machine learning model.

18 Claims, 8 Drawing Sheets

(56) References Cited

U.S. PATENT DOCUMENTS

| | | |
|---|---|---|
| 2012/0269436 A1 | 10/2012 | Mensink et al. |
| 2013/0018828 A1 | 1/2013 | He et al. |
| 2015/0149191 A1 | 5/2015 | Lee et al. |
| 2017/0177703 A1 | 6/2017 | Liu |
| 2017/0185674 A1 | 6/2017 | Tonkin et al. |
| 2019/0147297 A1 | 5/2019 | Rogers et al. |

OTHER PUBLICATIONS

De Bem, Rodrigo et al. "A Semi-supervised Deep Generative Model for Human Body Analysis," ECCV, Sep. 8-14, 2018.

Ratner, Alexander et al. "Training Complex Models with Multi-Task Weak Supervision," arXiv:1810.02840v2, Dec. 7, 2018.

To, Hoai-Viet et al. "An Adaptive Machine Learning Framework with User Interaction for Ontology Matching," IIWeb'09, Jul. 2009.

Xiang, Chunchen et al. "ERSOM: A Structural Ontology Matching Approach Using Automatically Learned Entity Representation," OAEI, Proceedings of the 2015 Conference on Empirical Methods in Natural Language Processing, pp. 2419-2429, Sep. 2015.

Ratner, Alexander et al. "Snorkel: Rapid Training Data Creation with Weak Supervision," PVLDB, 11 (3): 269-282, Nov. 2017.

\* cited by examiner

ONTOLOGY MATCHING BASED ON WEAK SUPERVISION

CROSS-REFERENCE TO PRIOR APPLICATION

Priority is claimed to U.S. Provisional Application No. 62/954,709, filed on Dec. 30, 2019, which is hereby incorporated by reference herein.

FIELD

The present invention relates to ontology alignment, weak supervision, unlabeled data, labelling functions, embedding functions, and distance functions.

BACKGROUND

In the past, many IT systems or platforms have been built up individually for different application purposes and very often each of them just becomes an isolated data silo. This happens across domains and organizations, and even across different departments within the same organizations. There is a need to integrate and link those data silos so that the value of existing data could be further increased and maximized by enabling new services and applications across silos.

An approach is to integrate data and services across silos at the semantic level, which requires the ontologies used by different silos to be aligned. Ontology matching is one of the key problems for ontology alignment. The target of ontology matching is to find the semantic mappings between two classes from two given ontologies, which are usually called as source ontology and target ontology.

There have been lots of existing studies to ontology matching in the state of the art, which include the following two types of approaches:

(1) Supervised learning that relies on manually labelled data sets to train a learning model and then utilizes the trained model to decide whether a class in the source ontology could be mapped with another class in the target ontology. However, manually labelling the data is expensive and time-consuming. Due to this reason, many of existing models for ontology matching are just trained with small labelled data sets. This often leads to unstable performance when being applied across domains.

(2) Unsupervised learning that relies on some heuristic similarity functions to perform either ranking or clustering and then selects the top candidates as the matched options. However, since the unsupervised learning approach does not use any labelled data, its accuracy is difficult to measure such that its reliability and effectiveness are difficult to quantify.

SUMMARY

In an embodiment, a method for matching a set of first classes assigned to a first data set with a set of second classes assigned to a second data set includes constructing, via a set of pre-processing functions, a plurality of alignment profiles such that at least one alignment profile is assigned to each of the first classes and each of the second classes. The method includes generating a comparison matrix for each group of the alignment profiles, such that each group includes at least one of the first classes and at least one of the second classes. The method includes training a first machine learning model, through supervised training, based on the generated comparison matrices and based on probabilistic labels generated by a second machine learning model. The second machine learning model has been trained through weakly supervised learning. The method includes determining, with the trained first machine learning model, which of the first classes can be matched with any of the second classes.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
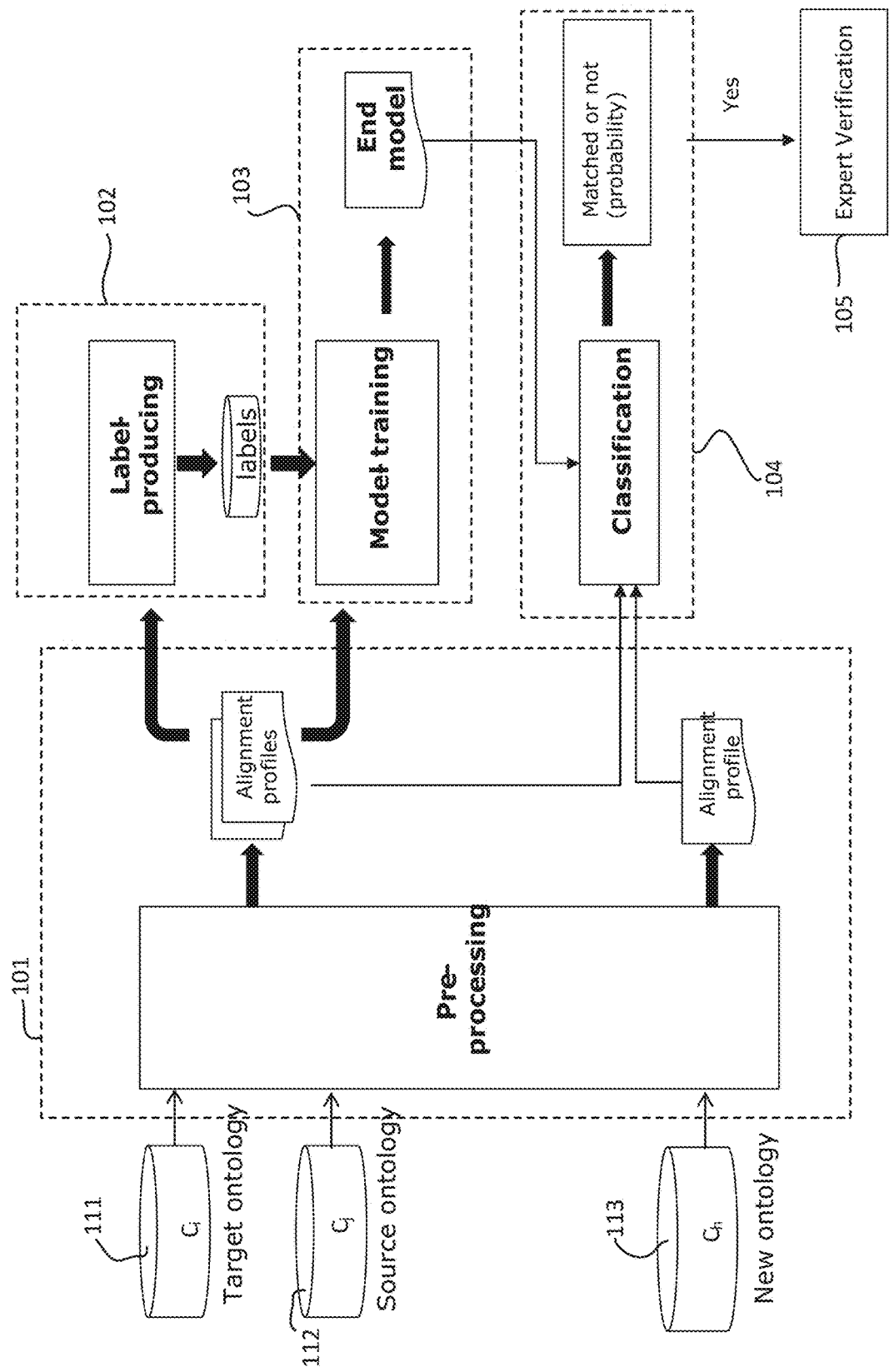
FIG. 1 illustrates a weakly-supervised ontology matching method, according to an embodiment.

An embodiment of the invention provides weak supervision to perform ontology matching using a set of pre-processing functions, labelling function, embedding functions, and distance functions. With this approach, a large amount of existing unlabeled data can be utilized to train an advanced model for more accurate ontology matching with low labelling cost, thus improving the efficiency of processing resources. The embodiment is very flexible and scales to leverage domain knowledges and the state-of-the-art methods.

In contrast to existing approaches, an embodiment of the invention applies a weak supervision approach to the ontology matching problem. The embodiment can not only reduce expensive labelling costs, but also be able to leverage and combine the capabilities of existing heuristic unsupervised learning approaches and prior domain knowledge to produce high quality probabilistic labelled data for training a more advanced supervised learning model. As a result, the embodiment enhances computer functioning by improving the efficiency and power of processing resources.

In comparison to existing approaches, an embodiment of the present invention is configured to: utilize a large amount of unlabeled data to improve the accuracy of ontology matching; provide robust and scalable performance when being applied to various across domains; and be extended without retraining when adding new functions for labelling, embedding, and distance estimation.

The technical benefits of an embodiment of the invention include: (1) reducing the cost, and thus processing resources, associated with labelling data; (2) achieving high accuracy, and thus reduced processing resources, for ontology matching by being able to use as many unlabeled data as possible and also the knowledge from existing heuristic algorithms; (3) being more robust and flexible to handle the cross-domain ontology alignment; (4) providing a capability to automatically label electronically compiled data sets of such magnitude that doing so manually would be near impossible.

Thus, embodiments of the present invention (1) provide machine learning models that utilize a large amount of unlabeled data to improve the accuracy of ontology matching where the magnitude of the unlabeled data is such that doing so manually would be near impossible; (2) provide robust and scalable performance when being applied across multiple domains, thus conserving processing resources; and (3) can be extended without retraining of the machine learning models when new functions for labeling, embedding, and/or distance estimation are added, thus conserving processing resources.

An embodiment of the present invention (e.g., a processing system) is configured to:

(1) Convert each class in an ontology into an alignment profile via a set of pre-processing functions so that various labelling functions and embedding functions can be directly applied.

(2) Calculate a comparison matrix for each pair of classes as the input data to train a sophisticated supervised model, together with the probabilistic labels generated by weak supervised learning.

An embodiment of the present invention is a processing system including one or more processors, configured alone or in combination, to perform a method including:

1) constructing alignment profile via a set of pre-processing functions;
2) writing label functions based on alignment profile construction;
3) performing weak supervision to train a generative model based on a set of labelling functions;
4) producing probabilistic labels for the alignment profiles of each pair of classes based on the generative model;
5) filtering out some labels based on their probability;
6) using various embedding functions to convert a sub-view of the alignment profile into a vector;
7) calculating the similarity of their converted vector representations for each two classes using various distance functions;
8) using the labelled comparison matrixes as the inputs to train an end model with supervised learning models such as CNN model;
9) applying the trained end model to determine whether two classes in different ontologies could be matched or not.

In an embodiment, a method for matching a set of first classes assigned to a first data set with a set of second classes assigned to a second data set includes: constructing, via a set of pre-processing functions, a plurality of alignment profiles such that at least one alignment profile is assigned to each of the first classes and each of the second classes; generating a comparison matrix for each group of the alignment profiles, such that each group includes one of the first classes and one of the second classes; training a first machine learning model, through supervised training, based on the generated comparison matrices and based on probabilistic labels generated by a second machine learning model, wherein the second machine learning model has been trained through weakly supervised learning; and determining with the trained first machine learning model which of the first classes can be matched with any of the second classes.

The method can include assigning a common new classification to each group of first and second classes based on a determination that the first and second classes can be matched. The method can include applying a plurality of pre-processing functions to generate an alignment profile for each of the first classes and each of the second classes to describe their self-contained characteristics. The method can include applying a plurality of labelling functions and a plurality of embedding functions to each of the alignment profiles.

The method can include generating labelling functions based on the constructed alignment profiles; and training the second machine learning model, through weakly supervised learning, based on the generated labelling functions. The method can include generating the probabilistic labels to each group of the alignment profiles based on the trained second machine learning model, where each group of the alignment profiles includes one of the first classes and one of the second classes.

In an embodiment, the method includes removing at least some of the probabilistic labels based on their respective probabilities. The method can include applying one or more embedding functions to convert partial or entire information of each alignment profile into a vector such that each vector provides a new representation of the first or second class assigned to the respective alignment profile; and for each group of the alignment profiles, calculating a similarity between the vectors of the respective alignment profile based on one or more distance functions.

In an embodiment, the method includes generating the comparison matrices for each group of the alignment profiles based on the similarities of the first class and the second class that are calculated by different combination of embedding functions and distance functions. In the method, the first machine learning model can be a convolutional neural network. A non-transitory computer-readable medium can include program code for configuring a processing system comprising one or more processors to perform the method.

In an embodiment, a processing system includes one or more processors configured to perform a method for matching a set of first classes assigned to a first data set with a set of second classes assigned to a second data set by: constructing, via a set of pre-processing functions, a plurality of alignment profiles such that at least one alignment profile is assigned to each of the first classes and each of the second classes; generating a comparison matrix for each group of the alignment profiles, such that each group includes one (i.e., at least one) of the first classes and one (i.e., at least one) of the second classes; training a first machine learning model, through supervised training, based on the generated comparison matrices and based on probabilistic labels generated by a second machine learning model, wherein the second machine learning model has been trained through weakly supervised learning; and determining with the trained first machine learning model which of the first classes can be matched with any of the second classes.

In an embodiment, the one or more processors are configured to assign a common new classification to each group of first and second classes based on a determination that the first and second classes can be matched. In an embodiment, the one or more processors are configured to apply a plurality of pre-processing functions to generate an alignment profile for each of the first classes and each of the second classes to describe their self-contained characteristics. In an embodiment, the one or more processors are configured to apply a plurality of labelling functions and a plurality of embedding functions to each of the alignment profiles.

In an embodiment, a processing system includes one or more processors configured to perform a method for matching a set of first classes assigned to a first data set with a set of second classes assigned to a second data set by: constructing, via a set of pre-processing functions, a plurality of alignment profiles such that at least one alignment profile is assigned to each of the first classes and each of the second classes; generating a comparison matrix for each group of the alignment profiles to include the similarities of the first class and the second class within each group, which are calculated by different combinations of embedding functions and distance functions; training a first machine learning model, through supervised training, based on the generated comparison matrices and based on probabilistic labels generated by a second machine learning model, wherein the second machine learning model has been trained through weakly supervised learning; and determining with the trained first machine learning model which of the first classes can be matched with any of the second classes.

In an embodiment, the one or more processors are configured to assign a common new classification to each group of first and second classes based on a determination that the first and second classes can be matched. In an embodiment, the one or more processors are configured to apply a plurality of pre-processing functions to generate an alignment profile for each of the first classes and each of the second classes to describe their self-contained characteristics. In an embodiment, the one or more processors are configured to apply a plurality of labelling functions and a plurality of embedding functions to each of the alignment profiles.

FIG. 1 depicts an embodiment of a weakly-supervised ontology matching method. In FIG. 1, target ontology 111 can represent a set of first classes assigned to a set of target data. Source ontology 112 can represent a set of second classes assigned to a set of source data for training a machine learning model. New ontology 113 can represent a set of new classes assigned to a set of new data that is not seen by the training process of the machine learning model.

In an embodiment, the present invention matches the first classes to second classes to generate a plurality of groups such that each group includes one first class and one corresponding matched second class. Based on the generated groups, a machine learning model is trained and then utilized to automatically classify the matched classes between the target ontology and the new ontology.

As shown in FIG. 1, an embodiment of the invention (e.g., a method) includes four steps:

Block 101: Pre-processing to create a self-contained alignment profile for each class within its own overall context (e.g., its defined properties, neighbors in the ontology, statistical properties of its data instances).

Block 102: Label-producing to create labelled data out of the alignment profiles by using a set of labelling functions and each labeling function can make its own judgement if a pair of classes are matched or not.

Block 103: Model-training to train a supervised end model based on the provided labelled data using a comparison matrix that is derived from a set of embedding functions and distance functions.

Block 104: Classification to predict whether the classes from a new ontology (i.e., a new set of classes) can be matched with the classes in the target ontology (e.g., a preexisting set of classes) based on the trained end model and the prediction will be used to help domain experts to reduce their effort and time on ontology assignment. In an embodiment, the classification in block 104 can be conducted via a trained neural network (e.g., the trained model of block 103). Block 105: Expert verification to further validate whether the predicted matches are correct.

Figure 2:
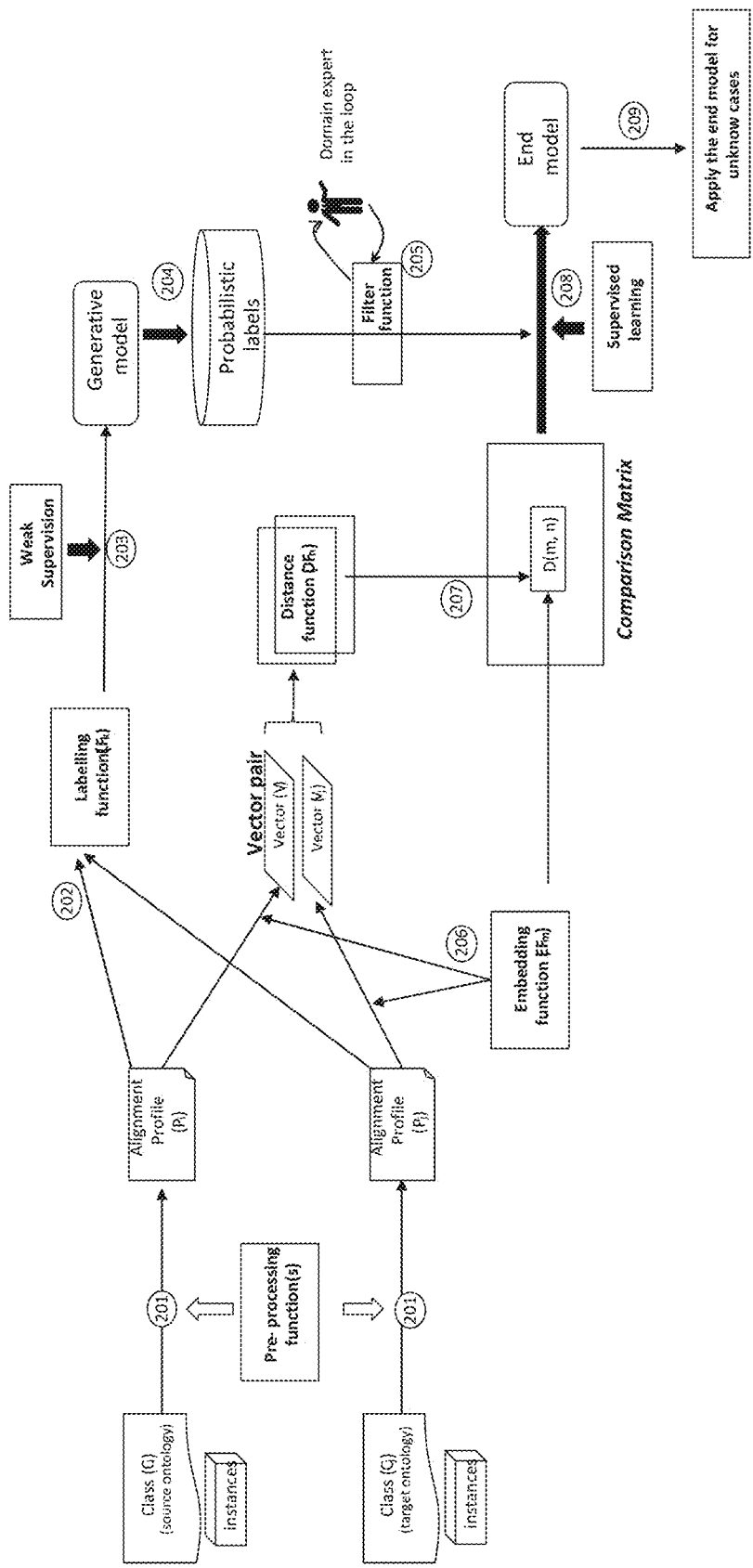
FIG. 2 illustrates steps (e.g., primary steps) to enable profile-based ontology matching using weak supervision, according to an embodiment.

Additional details of the embodiment shown in FIG. 1 are illustrated in FIG. 2, which depicts primary steps, according to an embodiment, to enable profile-based ontology matching through weak supervision.

Block 201: constructing an alignment profile for each class in both the source ontology and target ontology via a set of pre-processing functions Ontology classes represent key concept in an ontology, which can represent instances of real entities, e.g., there might exist a car class in the source ontology and an automobile class in the target ontology. When comparing two classes, an embodiment can put them into certain context and compare them within certain context. For each class in an ontology, an embodiment can derive a comprehensive view for each class so that domain experts could easily write a new label function to judge whether they are the same or not. The embodiment can utilize a set of pre-processing function to construct an alignment profile to each class.

Figure 3:
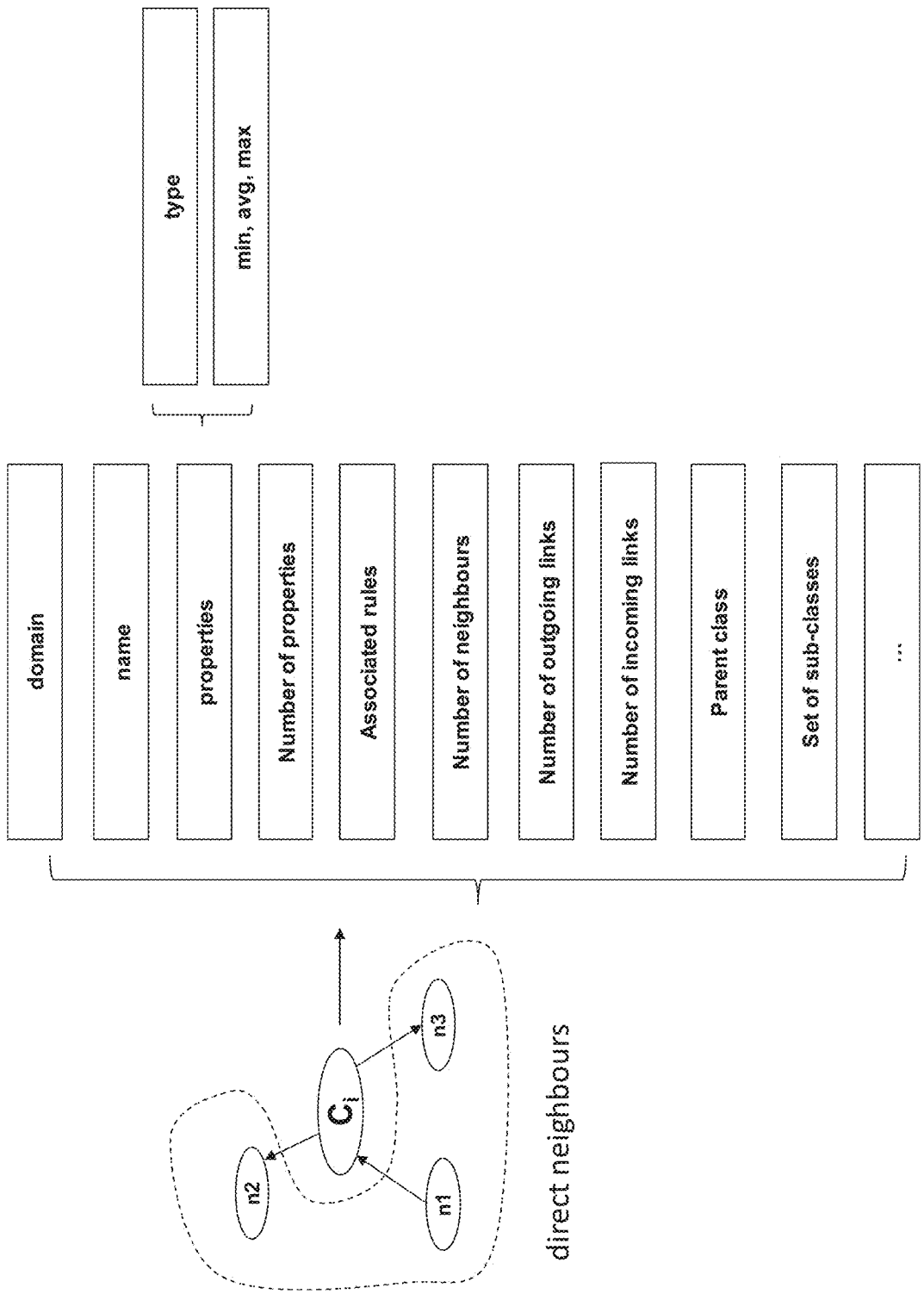
FIG. 3 illustrates the alignment profile model for each class derived by pre-processing functions, according to an embodiment.

An embodiment of this alignment profile is designed to cover all different perspectives for making the two classes (e.g., one class from the target ontology and another class from the source ontology) comparable. As illustrated in FIG. 3, an embodiment includes not only the basic information such as domain, comments, name, properties and their ranges, but also other context information in terms of how it is related to the other neighboring nodes in the overall ontology and what are the statistical features of its individual instance data. This exemplary alignment profile enables domain experts (or an embodiment of the processing system) to directly come up with any label functions or apply existing heuristic comparison functions to decide whether two classes are matched with each other. As referenced above, FIG. 3 depicts the alignment profile model for each class derived by pre-processing functions, according to an embodiment.

Block 202: writing label functions based on the constructed alignment profiles to decide if the two classes are matched or not.

Figure 8:
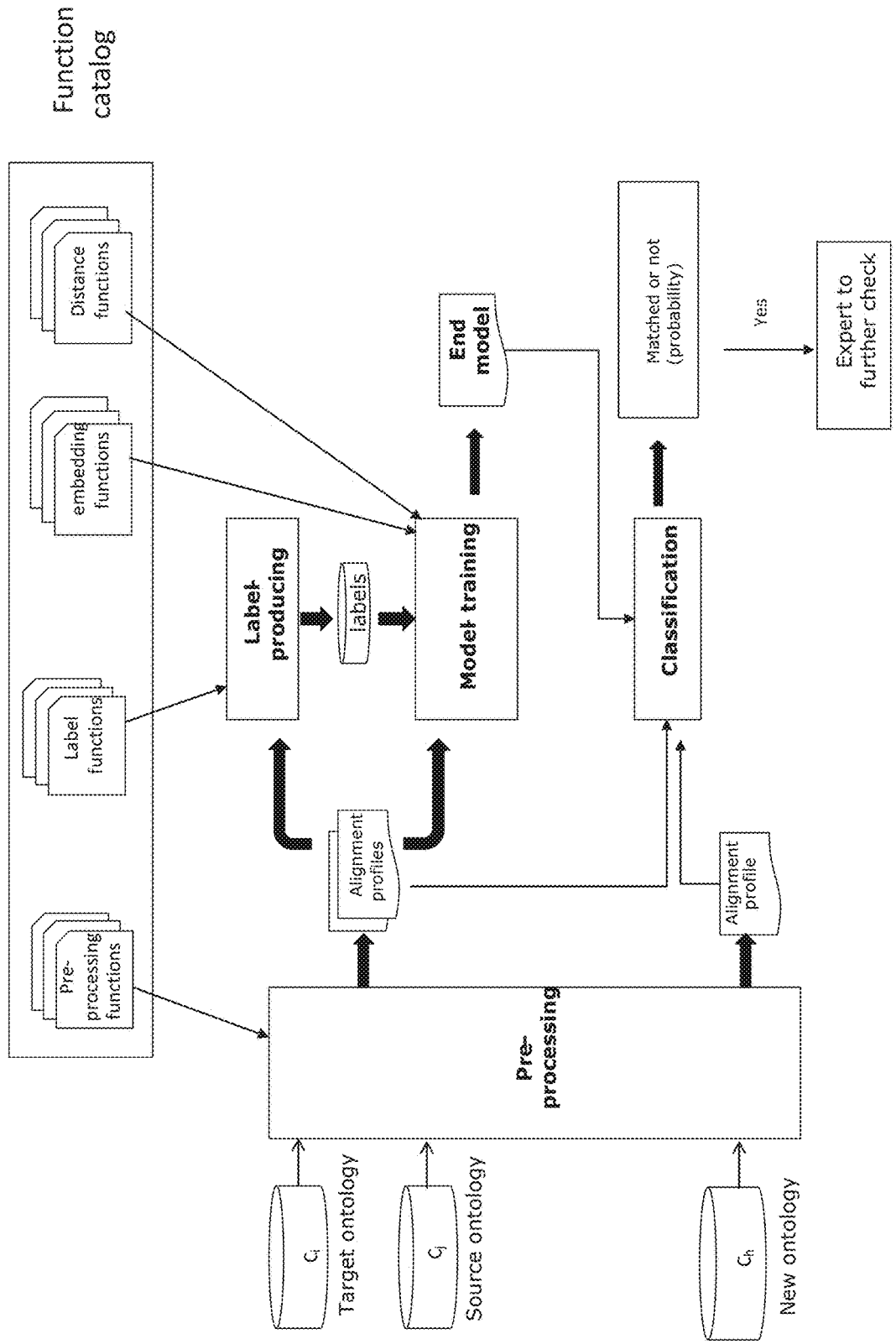
FIG. 8 illustrates a weakly-supervised ontology matching method, according to an embodiment.

Labeling functions (see, e.g., FIG. 8 encode an indication if two classes are equivalent (e.g., matching). The reason behind that can be founded in domain knowledge, or general, experience-based heuristics. An embodiment of the invention exploits that these functions can generally be separated into two categories: (1) general applicable heuristics (e.g., syntactic string matching) and (2) domain, i.e., ontology specific labeling functions (e.g., TODO good example).

For (1), the embodiment (e.g., a processing system) implements a library that includes a set of function encoded general heuristics as a base. This relieves users from implementing reoccurring heuristics themselves. For (2), the embodiment (e.g., the processing system) provides the following interface, designed for domain experts to write label functions (LFs), which can produce the labelled result for any given two classes: $C_s$ from the source ontology ($O_s$) and $C_t$ from the target ontology ($O_t$). Assume that the constructed alignment profiles for $C_s$ and $C_t$ are $P_s$ and $P_t$, label function is defined as below.

$$LF = \text{function}(C_s, C_t) = \begin{cases} 1, & \text{true case(these two classes are equivalent)} \\ 0, & \text{unclear case(it is unknown whether they are matched or not)} \\ -1, & \text{false case(these two classess are not matched)} \end{cases}$$

In an embodiment, the output of the label function can extend from the range [0, 1] where 1 is the true case, 0.5 is the unclear case, and 0 is the false case. Provided are a set of examples of possible label functions that could be provided by domain experts. One or more can be applied.

LF1: check the name equivalence of two classes (Cs and Ct) using pure string comparison; if two names are "true", return true; otherwise, return "unknown".

LF2: check the name similarity of two classes (Cs and Ct) using word embedding; Provide two thresholds (h1, h2, h1>h2), if the similarity >h1, return "true"; if the similarity <h2, return "false"; for the rest, return "unknown".

LF3: check the overlapped words in the name plus the frequency of those words (how many times they are used in some class names).

LF4: check the distance of names for two classes using Levenshtein Distance, which is used to calculate the differences between sequences.

LF5: compare the synonyms of class names; it is checking the lexical relation of two words by using the external word dictionary.

LF6: compare the synonyms for words [extracted from the class name]; it is checking the lexical relation of two words by using the external word dictionary.

LF7: check the acronyms of names to see if they are equal; for example, Standard Instrument Departure is often represented in short as "SID".

LF8: check the similarity of comments for two classes using word embedding.

Block 203: performing weak supervision to train a generative model based on a set of labelling functions.

Figure 4:
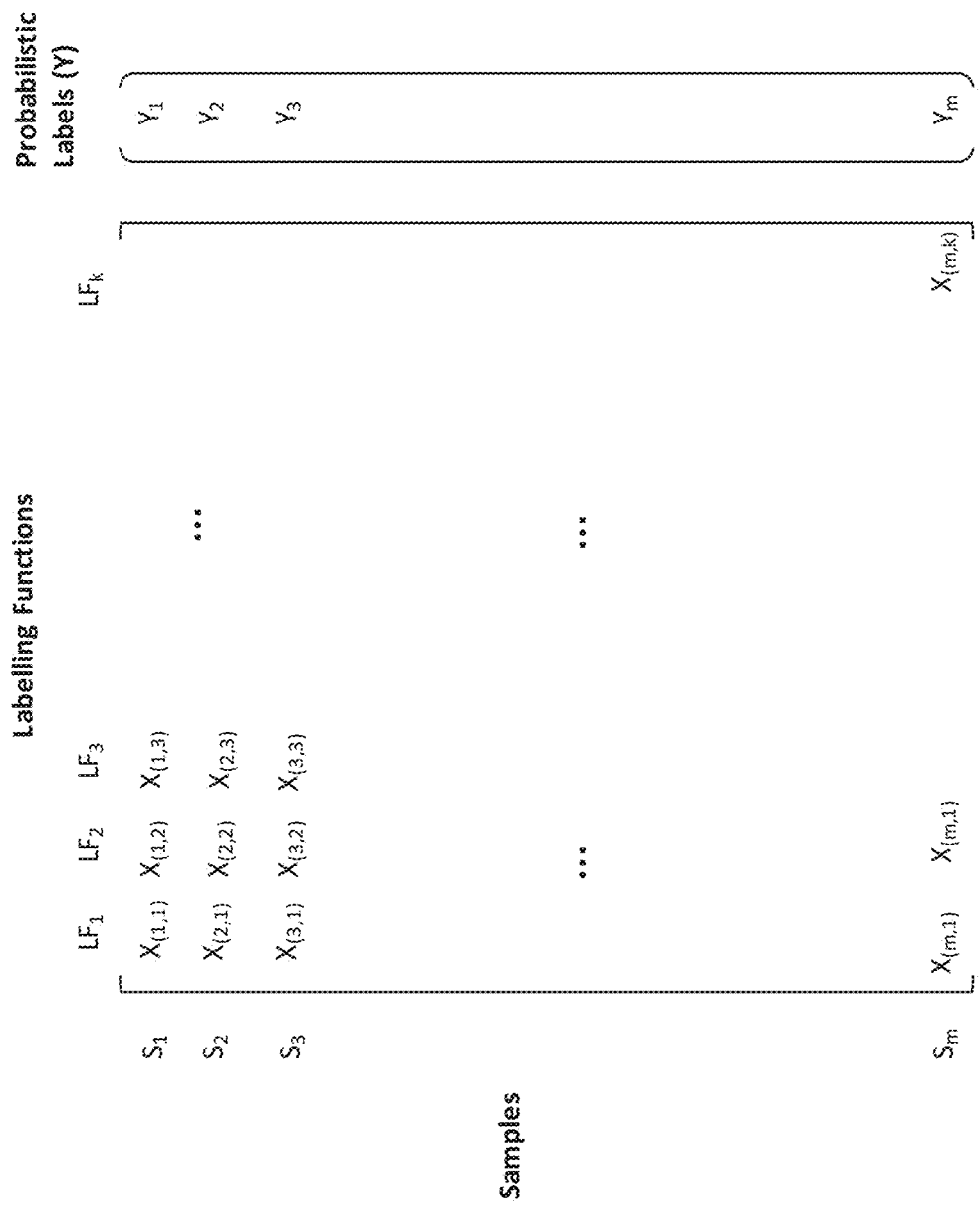
FIG. 4 illustrates producing labels for the alignment profiles of each pair of classes based on the generative model, according to an embodiment.

With the provided set of labelling functions [LF1, LF2, LF3, . . . , LFk] and the total number of samples [S1, S2, S3, . . . , Sm], the following matrix (X) is generated by applying all label functions over the provided sample data points. As illustrated in FIG. 4, X(i, j) is the label produced by label function LFj for the data sample Si. The value of X(i, j) could be 1, 0, or −1, as the output of LFj.

Figure 5:
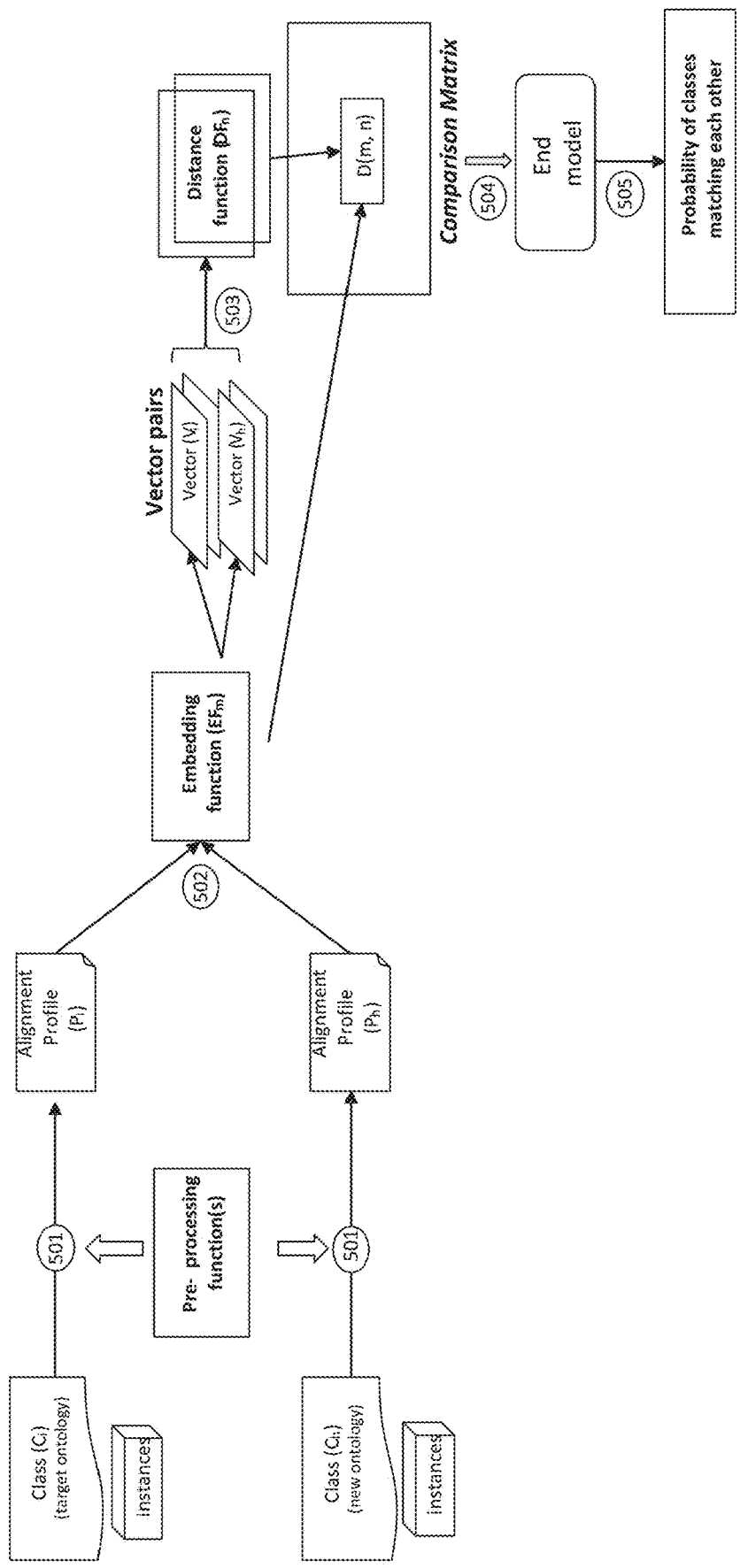
FIG. 5 illustrates applying the trained end model in the operation phase, according to an embodiment.

Assuming that the outputs of the labelling functions are conditionally independent to give their honest but not malicious labels, a generative model (GM) can be estimated based on a set of hyperparameters by maximizing the log marginal likelihood of the observed label matrix (X). In an embodiment, this feature maximizes the agreements while minimizing disagreements between the labeling functions, as contained in the observed label matrix (X). As shown in FIG. 5, model training can rely on embedding functions and/or distance functions.

Block 204: producing labels for the alignment profiles of each pair of classes based on the generative model.

Once the generative model is generated by the weak supervision phase, it can be utilized to produce probabilistic labels for all unlabeled data set. As shown in FIG. 4, for a sample Si, its probabilistic label Yi is the output of GM(Si), which is an array that includes the probabilities p1, p2, p3 (p1+p2+p3=1, 0<=p1<=1, 0<=p2<=1, 0<=p3<=1) of true case, unclear case, false case.

Block 205: filtering out some label based on their probability

In an embodiment, the output of the generative model is probabilistic label for each pair of classes from the source and target ontology (e.g., based on both the source and target ontologies). In an embodiment, the probabilistic label combines the knowledge derived from all labeling functions, accounting for different function weights according to the modelled accuracy of each labeling function.

Two obstacles can occur: (1) Many existing learning methods cannot work (well) with such probabilistic labels as they are designed for deterministic labels; (2) Some probabilistic labels might be of low quality, i.e., the generative model could not well distinguish between the two classes (equivalent vs non-equivalent). An embodiment of the invention overcomes these problems by transforming the probabilistic labels into deterministic labels and filtering out low quality labels.

Where the probability of a match between two classes can be anywhere in the range (e.g., probabilistic range) from 0 (indicating that they are definitely not a match) and 1 (indicating that they are definitely a match).

In this step, an embodiment applies a filter function that removes any class pairs whose probability is outside a definable threshold, (e.g., a value between zero and one). In that way, the embodiment ensures that the later to be trained ML model (see Block 8) is not trained with noisy labeled data.

However, the filtered-out labels might provide much valuable input data for the training step as they are instanced which are hard to distinguish by the generative model. For that reason, an embodiment is configured to feed such labels back to a crowd-sourcing module. This module provides such examples to the domain expert, who then can manually assign the correct label. These labels are fed back and added to the set of existing labeling functions, triggering a re-generation of the generative model and eventually reduce the number of in-between, noisy labels.

Block 206: using various embedding functions to convert a sub-view of the alignment profile into a vector.

With a large amount of generated probabilistic labels, it is possible to train a supervised learning model. However, it can be nearly impossible to directly use the original sample data to do training without losing their context. Existing solutions use only one single embedding function and one specific distance function to calculate a vector to do distance learning, which is not flexible and also limited to only one comparable view of two classes.

An embodiment of the invention provides a more flexible and comprehensive way of leveraging various embedding functions (EFs) to convert a sub-view of the alignment profile into a vector presentation and make it comparable between two classes. For example, a word embedding function can be used to convert the domain, name, and type of the alignment profile. Those are string-based sub-views of the alignment profile for a given class in the ontology. A graph embedding function can be used to convert the neighborhood of the alignment profile, which is a graph-structure based view of the alignment profile for the given class in its own ontology.

Block 207: calculating the similarity of their converted vector representations for each two classes using various distance functions.

In an embodiment of the invention, a set of distance functions are used to measure the similarity of two vectors.

The selection of distance function depends on the characteristic of the vectors. Even for the same type of vectors, such as numerical vectors, multiple distance functions could be applied. In many cases it is difficult to judge which distance metrics is better than the other one, especially when there is no golden ground-truth. In order to fully reflect the similarity of two classes in many possible ways, an embodiment applies all possible distance functions to the vector pair, which is derived from a given embedding function based on the constructed alignment profile. In the end, it is up to the end model to prioritize the importance of each distance metrics based on the parameters learned from the produced labels. For example, the following three distance functions can be all applied to two given vectors $V_1[a_1, a_2, a_3, \ldots, a_n]$, $V_2[b_1, b_2, b_3, \ldots, b_n]$.

| Distance Functions (DF) | Meaning |
| --- | --- |
| Euclidean distance | Distance between ends of vectors |
| Cosine | Cosine of angle θ between vectors |
| Dot Product | Cosine multiplied by lengths of both vectors |
| Jaccard Similarity | Comparing two binary vectors |
| Jensen-Shannon | Measuring the similarity between two probability distributions |

Block 208: using the labelled comparison matrix as the inputs to train an end model with supervised learning models such as CNN (convolutional neural network) model.

For two classes ($C_1$, $C_2$) with their alignment profiles ($P_1$, $P_2$), the following comparison matrix (CM) can be generated after applying a set of embedding functions ($EF_1$, $EF_2$, $EF_3$, ..., $EF_g$) and a set of distance functions ($DF_1$, $DF_2$, $DF_3$, ..., $DF_h$), as illustrated by the following equation.

$$CM(i,j)=D=DF_j(V_1,V_2)=DF_j(EF(P_1),EF(P_2))$$

In the end, for each pair of classes in two different ontologies, the generated comparison matrix is used as the input to train a supervised learning model (such as CNNs, SVMs (support vector machines) or even Random Forests), together with the corresponding labels.

Block 209: applying the trained end model to determine whether two classes in different ontologies could be matched or not Now that the supervised learning model has been trained, an embodiment of the invention can apply it to other, previously unknown and new ontologies to align them. In order to do so, the embodiment can follow the steps, illustrated in FIG. 5, which depicts application of the trained end model in the operation phase.

Block 501: Pre-process the classes of both ontologies to be aligned to generate the alignment profile for each class.

Block 502: Apply them embedding functions to convert the alignment profiles into m vectors for each class.

Block 503 Apply the n distance functions to each pair of vectors generated in the previous step, in this way an embodiment generates an m×n matrix per each pair of classes to be compared.

Block 504: For each pair of classes, an embodiment feeds their corresponding matrix to the end model produced in Block 208.

Block 505: The embodiment, via the model, outputs the probability of the pair of classes being a match.

System view of ontology matching based on weak supervision

Figure 6:
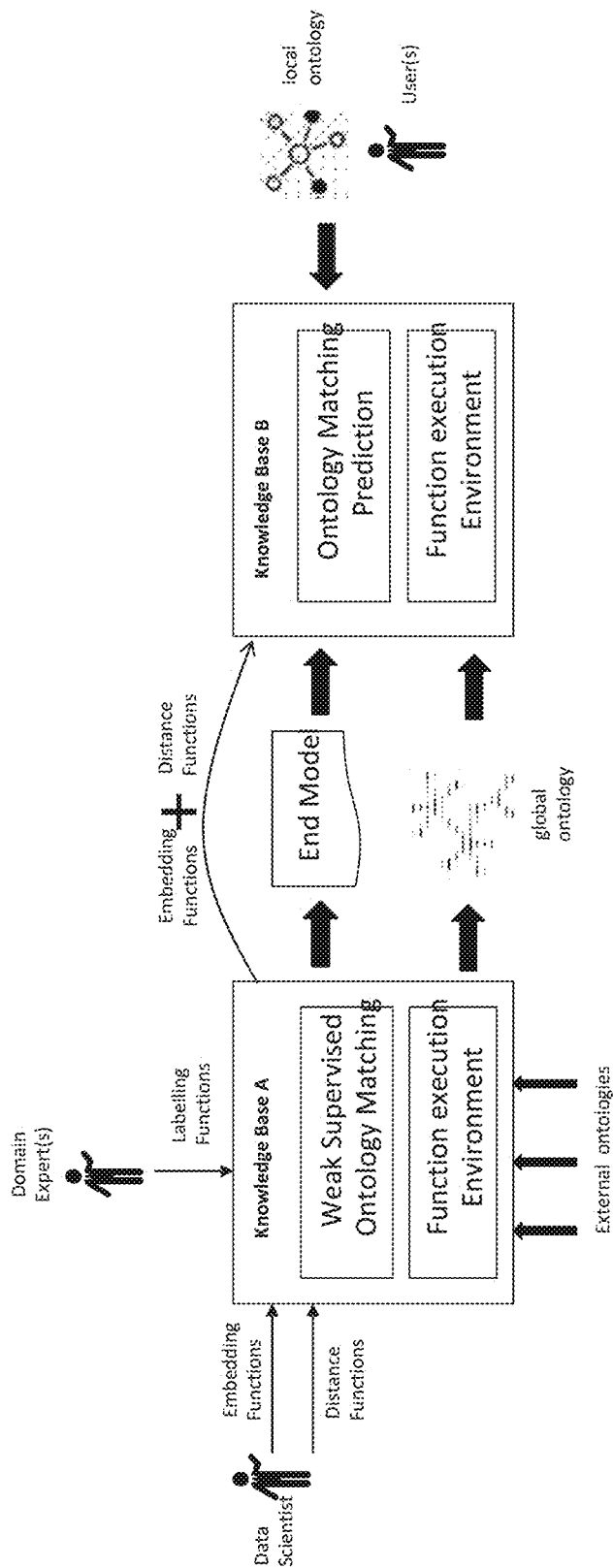
FIG. 6 illustrates a system view of ontology matching based on weak supervision, according to an embodiment.

The following exemplary system is configured to carry out the above-described methods for weak supervision-based ontology matching. As illustrated by FIG. 6, an embodiment of the system includes two knowledge bases A and B. Each knowledge base is deployed on some computer system with certain computation and storage resources, which could be a single machine, a cluster, or some cloud nodes.

The knowledge base A can be for the training and learning of an end model for ontology matching. Many external ontologies are collected from external sources as unlabeled data set and used as the input of the weak supervision learning. Before the learning phase starts, it can require domain experts to provide a set of labelling functions and data scientists to provide a set of embedding functions and distance functions. Then the weak supervised ontology matching module will follow the proposed steps (e.g., blocks 201-208) to produce an advanced end model.

During this learning phase, it can leverage a function execution environment to run all functions (e.g., labelling functions, embedding functions, distance functions). Once the end model is generated, it can be forwarded to knowledge base B. In the meantime, using the generated end model, knowledge base A can combine all external ontologies that have been used during the learning phase to produce a global ontology for bootstrapping the other knowledge base B.

In knowledge base B, according to an embodiment, the ontology matching prediction module utilizes the end model and the consolidated global ontology to bootstrap the ontology matching service, which will take a local unknown ontology provided by a user and then apply the end model to provide the suggestions on which class in the local ontology can be matched with another class in the global ontology. When applying the end model in knowledge base B, the same set of embedding functions and distance functions can be used as well.

Use Case 1: matching IoT data with applications for cross-city smart city solutions In smart cities there are lots of IoT (Internet of Things) devices deployed and managed by different providers. Usually those IoT devices constantly provide JSON data to report their observations over time. Since those devices are from different device manufactures and operated by different organizations, for example, temperature sensors, parking sensors, street lamps, those IoT data are highly heterogenous. However, on the other side, for smart city application developers or smart city platform/solution providers, it is a challenge to deal with those heterogenous IoT data.

In an embodiment, IoT data is semantically annotated by matching the JSON schema of IoT data (which can be considered as a class in some local ontology defined by IoT data provider) to the global ontology. In this case, as long as smart city applications are designed based on the global ontology (e.g., new ontology 113), those applications can be matched to the annotated IoT data for better interoperability. This will reduce development effort to change those smart city applications to adapt to the new IoT sensor data and also ease the data integration process. For example, by aligning the data schema between parking sensors in Paris (e.g., the target ontology 111) with the smart parking application running on a connected car from Germany (e.g., the source ontology 112), the car driver could be navigated to an available parking slot around her/his destination.

Use Case 2: Integrating Heterogenous Medical Data for Cross-Hospital Data Analytics Often hospitals and clinics utilize different equipment and systems from various providers to collect and manage the medical records from patients. Those data are highly heterogenous, such as csv tables, records in relational databases, and object documents in NoSQL databases. In reality, as patients might go from one hospital to another hospital, doctors need to collect their medical records from different hospitals in order to have a more comprehensive view for a detailed medical diagnosis.

An embodiment of the present invention integrates those heterogenous media records across hospitals for medical treatment. For example, when there is a car accident, the doctors in the ambulance could quickly check the medical history of the injured person from the hospitals, which the injured person has granted the access in an emergence situation, and then decide which type of medicine they can use immediately. Also, with the real-time information from the hospitals around, the ambulance can be scheduled to the hospital where the injured person can be treated immediately. The classifications applied by a first hospital can be target ontology 111 while the classifications applied by a second hospital can be source ontology 112.

Use Case 3: Interoperability Between Data and Service Applications for Cross-Nation Product Supply Chain Systems In the cross-nation product supply chain systems, products are produced in one country and then shipped to another country for further assembling; later when the assembled product is sold to customers, further information needs to be collected for maintenance. During the entire product lifetime, the product information needs to be shared and manipulated among organizations across different countries at different phases. For each phase, different applications from each organization can be matched with the data representation of the products via disclosed embodiments of the ontology alignment methods so that the interoperability between product data and specific business-related service applications can be achieved with minimal effort. For example, when a container with a RFID sensor is shipped from Germany to India and gets checked at an Indian harbor, the container management system at the Indian harbor can immediately know where this container comes from and how to send this container. The container management system at the Indian harbor can apply classifications in target ontology 111 and the container management system in Germany can apply classifications in source ontology 112.

In an embodiment, domain experts are required to provide labelled functions with reasonable accuracy. The domain experts can be trained professionals or trained software algorithms running on an embodiment of the processing system. In an embodiment, the present invention provides a low-cost solution to enable data integration and also to build up advanced knowledge base for any other AI algorithms that rely on high quality graph data.

In an embodiment, the present invention is configured to: construct alignment profile for each class in an ontology; provide interfaces/GUI of labeling functions, embedding functions, and distance functions; provide a handbook; and construct a comparison matrix as the input for supervised learning.

Ontology matching has been a difficult problem for a decade. However, existing solutions are unable to provide reliable results across different data sets, because they are trained with only limited labelled data. An embodiment of the invention is able to overcome this limitation and allows us to achieve better and more reliable results.

Figure 7:
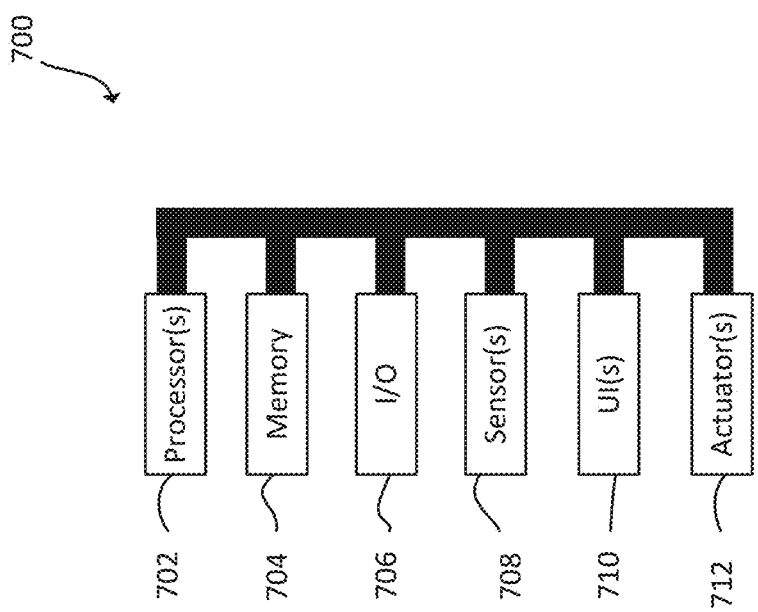
FIG. 7 is a block diagram of an exemplary processing system, which can be configured to perform any and all operations disclosed herein.

Referring to FIG. 7, a processing system 700 can include one or more processors 702, memory 704, one or more input/output devices 706, one or more sensors 708, one or more user interfaces 710, and one or more actuators 712. Processing system 700 can be representative of each system disclosed herein.

Processors 702 can include one or more distinct processors, each having one or more cores. Each of the distinct processors can have the same or different structure. Processors 702 can include one or more central processing units (CPUs), one or more graphics processing units (GPUs), circuitry (e.g., application specific integrated circuits (ASICs)), digital signal processors (DSPs), and the like. Processors 702 can be mounted to a common substrate or to multiple different substrates.

Processors 702 are configured to perform a certain function, method, or operation (e.g., are configured to provide for performance of a function, method, or operation) at least when one of the one or more of the distinct processors is capable of performing operations embodying the function, method, or operation. Processors 702 can perform operations embodying the function, method, or operation by, for example, executing code (e.g., interpreting scripts) stored on memory 704 and/or trafficking data through one or more ASICs. Processors 702, and thus processing system 700, can be configured to perform, automatically, any and all functions, methods, and operations disclosed herein. Therefore, processing system 700 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 700 can be configured to perform task "X". Processing system 700 is configured to perform a function, method, or operation at least when processors 702 are configured to do the same.

Memory 704 can include volatile memory, non-volatile memory, and any other medium capable of storing data. Each of the volatile memory, non-volatile memory, and any other type of memory can include multiple different memory devices, located at multiple distinct locations and each having a different structure. Memory 704 can include remotely hosted (e.g., cloud) storage.

Examples of memory 704 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 704.

Input-output devices 706 can include any component for trafficking data such as ports, antennas (i.e., transceivers), printed conductive paths, and the like. Input-output devices 706 can enable wired communication via USB®, DisplayPort®, HDMI®, Ethernet, and the like. Input-output devices 706 can enable electronic, optical, magnetic, and holographic, communication with suitable memory 706. Input-output devices 706 can enable wireless communication via WiFi®, Bluetooth®, cellular (e.g., LTE®, CDMA®, GSM®, WiMax®, NFC®), GPS, and the like. Input-output devices 706 can include wired and/or wireless communication pathways.

Sensors 708 can capture physical measurements of environment and report the same to processors 702. User interface 710 can include displays, physical buttons, speakers, microphones, keyboards, and the like. Actuators 712 can enable processors 702 to control mechanical forces.

Processing system 700 can be distributed. For example, some components of processing system 700 can reside in a remote hosted network service (e.g., a cloud computing environment) while other components of processing system 700 can reside in a local computing system. Processing system 700 can have a modular design where certain modules include a plurality of the features/functions shown in FIG. 7. For example, I/O modules can include volatile memory and one or more processors. As another example, individual processor modules can include read-only-memory and/or local caches.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for matching a set of first classes assigned to a first data set with a set of second classes assigned to a second data set, the method comprising:
    constructing, via a set of pre-processing functions, a plurality of alignment profiles such that at least one alignment profile is assigned to each of the first classes and each of the second classes;
    generating a comparison matrix for each group of the alignment profiles, such that each group includes at least one of the first classes and at least one of the second classes;
    training a first machine learning model, through supervised training, based on the generated comparison matrices and based on probabilistic labels generated by a second machine learning model, wherein the second machine learning model has been trained through weakly supervised learning; and
    determining, with the trained first machine learning model, which of the first classes can be matched with any of the second classes.

2. The method of claim 1, comprising assigning a common new classification to each group of first and second classes based on a determination that the first and second classes can be matched.

3. The method of claim 1, comprising applying a plurality of pre-processing functions to generate an alignment profile for each of the first classes and each of the second classes to describe their self-contained characteristics.

4. The method of claim 1, comprising applying a plurality of labelling functions and a plurality of embedding functions to each of the alignment profiles.

5. The method of claim 4, comprising generating the probabilistic labels to each group of the alignment profiles based on the trained second machine learning model;
    wherein each group of the alignment profiles includes one of the first classes and one of the second classes.

6. The method of claim 5, comprising removing at least some of the probabilistic labels based on their respective probabilities.

7. The method of claim 5, comprising: applying one or more embedding functions to convert partial or entire information of each alignment profile into a vector such that each vector provides a new representation of the first or second class assigned to the respective alignment profile; and
    for each group of the alignment profiles, calculating a similarity between the vectors of the respective alignment profile based on one or more distance functions.

8. The method of claim 1, comprising generating labelling functions based on the constructed alignment profiles; and training the second machine learning model, through weakly supervised learning, based on the generated labelling functions.

9. The method of claim 1, comprising generating the comparison matrix for each group of the alignment profiles based on similarities of the first class and the second class that are calculated by different combinations of embedding functions and distance functions.

10. The method of claim 1, wherein the first machine learning model is a convolutional neural network.

11. A non-transitory computer-readable medium comprising program code for configuring a processing system comprising one or more processors to perform the method of claim 1.

12. The method of claim 1, wherein the plurality of alignment profiles comprise human-readable data.

13. The method of claim 12, wherein the plurality of alignment profiles comprise text strings.

14. The method of claim 12, further comprising writing, via a domain expert, a label function based on the plurality of alignment profiles to determine whether one of the first classes of the set of first classes are matched with one of the second classes of the set of second classes.

15. A processing system comprising one or more processors configured to perform a method for matching a set of first classes assigned to a first data set with a set of second classes assigned to a second data set by:
    constructing, via a set of pre-processing functions, a plurality of alignment profiles such that at least one alignment profile is assigned to each of the first classes and each of the second classes;
    generating a comparison matrix for each group of the alignment profiles to include similarities of the first class and the second class within each group, which are calculated by different combinations of embedding functions and distance functions;
    training a first machine learning model, through supervised training, based on the generated comparison matrices and based on probabilistic labels generated by a second machine learning model, wherein the second machine learning model has been trained through weakly supervised learning; and determining with the trained first machine learning model which of the first classes can be matched with any of the second classes.

16. The system of claim 15, wherein the one or more processors are configured to assign a common new classification to each group of first and second classes based on a determination that the first and second classes can be matched.

17. The system of claim 15, wherein the one or more processors are configured to apply a plurality of pre-processing functions to generate an alignment profile for each of the first classes and each of the second classes to describe their self-contained characteristics.

18. The system of claim 15, wherein the one or more processors are configured to apply a plurality of labelling functions and a plurality of embedding functions to each of the alignment profiles.

* * * * *